United States Patent [19]

Ricciardi

[11] Patent Number: 4,670,786
[45] Date of Patent: Jun. 2, 1987

[54] VIDEO-CAMERA SYNCHRONIZING SYSTEM

[75] Inventor: Charles E. Ricciardi, Swampscott, Mass.

[73] Assignee: QSI Systems, Inc., Woburn, Mass.

[21] Appl. No.: 604,077

[22] Filed: Apr. 26, 1984

[51] Int. Cl.$^4$ .......................................... H04N 5/073
[52] U.S. Cl. .................................... 358/149; 358/148
[58] Field of Search .................... 358/149, 148, 17, 19

[56] References Cited

U.S. PATENT DOCUMENTS

| | | | |
|---|---|---|---|
| 4,038,683 | 7/1977 | Thorpe et al. | 358/19 |
| 4,214,261 | 7/1980 | Bazin et al. | 358/149 |
| 4,253,116 | 2/1981 | Rogers, III | 358/149 |
| 4,333,103 | 6/1982 | Koiwa et al. | 358/149 |
| 4,498,103 | 2/1985 | Aschwanden | 358/148 |

Primary Examiner—James J. Groody
Assistant Examiner—David E. Harvey
Attorney, Agent, or Firm—Cesari and McKenna

[57] ABSTRACT

Several cameras (12, 14, 16) have their composite-video outputs sent to a common switcher (24), which picks one of the outputs and sends it to a modulator (26) to be placed on a carrier and sent by antenna (28) to a central broadcast station. A central timing circuit or driver (30) sends master signals to signal-generating circuits (34, 36, 38), which receive the outputs of the cameras (12, 14, 16) and automatically adjust their output timing so that their synchronization signals are received in synchronism at the switcher (24). Timing comparators (62, 88) compare the timing of sync and subcarrier signals in the camera output with similar signals from the driver and in response control voltage-controlled oscillators (78, 104) that provide timing for the sync signals and colorburst signals that are sent to the cameras. By advancing or retarding the timing of the voltage-controlled oscillators in accordance with the relative leads or lags between the driver signals and the camera signals, the signal-generator circuits (34, 36, 38) keep the camera outputs at the switcher input ports in synchronism.

1 Claim, 3 Drawing Figures

VIDEO-CAMERA SYNCHRONIZING SYSTEM

BACKGROUND OF THE INVENTION

The present invention is directed to systems for maintaining synchronization among separate television cameras. In particular, it concerns systems for keeping the camera outputs in synchronism at a common switching point.

During the course of a television broadcast, video signals may be drawn from various sources in succession, and it is necessary that the synchronization signals from these sources coincide so that switching from one source to another does not result in such a change in timing as to cause receiving sets temporarily to lose synchronization and color phase reference.

At a television station, this synchronism is typically achieved by keeping a record of the last frame or two of the incoming signal and playing it back with a delay that causes its synchronization signals to coincide with those of the signals currently being transmitted. However, although this type of an arrangement is suitable at a television station, it is often impractical when a transmitter at a location remote from the station is being switched among signals from several cameras.

Accordingly, equipment at the remote location includes a device that sends synchronization signals to the several cameras so that the composite video signals from the various cameras are nominally in synchronism. Since there are differing delays in the various lines to and from the television cameras, though, it is necessary to adjust the timing relationship between the signals sent to the different cameras so that the sync signals from those cameras are in fact synchronized at the switching circuitry.

This requirement of synchronism necessitates the presence at the remote location of someone qualified to make the necessary timing adjustments. The timing adjustment is typically performed before a broadcast begins. But a particular set of adjustments is valid only so long as the electrical distances to the several cameras do not change. If it becomes necessary during the broadcast to increase the length of line to a particular camera, a delay adjustment must be made during the broadcast, too, and such an adjustment is often inconvenient at that time.

It is accordingly an object of the present invention to eliminate the need for personnel to make such timing adjustments.

SUMMARY OF THE INVENTION

The foregoing and related objects are achieved in a device that monitors the composite-video output received at a common reception point from each camera and in response automatically adjusts the synchronization signals sent to the cameras so that the camera outputs at the reception device are kept in synchronism.

The apparatus includes a central timing circuit and a plurality of signal-generating circuits, one associated with each of the cameras, to which the central timing circuit sends master sync signals. Each signal-generating circuit includes a sync generator, a voltage-controlled oscillator, and a comparison circuit. The voltage-controlled oscillator generates periodically occurring timing signals and applies them to the sync generator, which generates standard video sync pulses having a predetermined timing relationship with the timing signals. It sends these sync pulses to the associated video camera, which generates composite video in synchronism with the sync pulses that it receives. The composite video from the camera is received by the comparison circuit, which also receives the master sync pulses. It compares the timing of the master sync pulses at the central timing circuit with that of the sync pulses in the camera output at the common reception point, and it applies control signals to the voltage-controlled oscillator to adjust its timing in order to achieve a predetermined timing relationship between the camera sync pulses and the master sync pulses.

Specifically, the comparison circuit applies control signals to the voltage-controlled oscillator to advance the timing of the timing pulses if the associated camera sync pulses lag the predetermined timing relationship with the master sync pulses, and it applies control signals to retard the timing of the timing pulses if the camera sync pulses lead the associated predetermined timing relationship with the master sync pulses. Therefore, the sync pulses from the various cameras remain in synchronism at the common reception point even if the length of signal line to one or more of the cameras is changed. In color-television versions of the system, similar circuitry maintains synchronization among the color-burst signals from the various cameras.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

Figure 1:
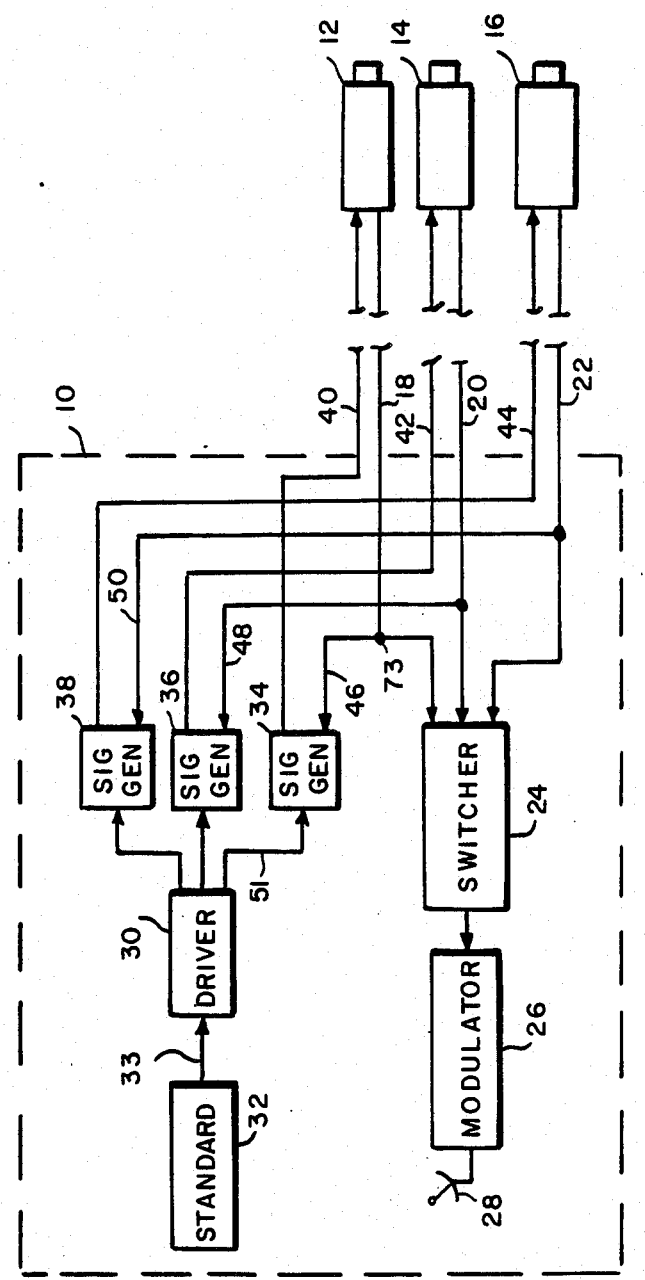
FIG. 1 is a block diagram depicting a plurality of television cameras at a remote location together with their associated synchronization and transmission circuitry.

FIG. 1 shows in block-diagram form a remote television transmission system 10, typically housed in a van or trailer, that receives signals from three television cameras 12, 14, and 16 over lines 18, 20, and 22, respectively. A switcher 24 receives the camera outputs and selects one of them to be sent to a modulator 26, which modulates a carrier signal with the video output and applies it to an antenna 28. The antenna sends the modulated carrier to a central station for further processing or broadcast.

A central timing circuit, driver 30, generates master sync signals in synchronism with reference signals that it receives from a reference source 32 over signal lines 33. The driver 30 sends these master sync signals to signal-generating circuits 34, 36, and 38, which send synchronization signals over lines 40, 42, and 44, respectively, to cameras 12, 14, and 16. The cameras 12, 14, and 16 use these signals to generate composite video that they send back to the switch 24 over lines 18, 20, and 22, respectively.

The synchronization signals from signal-generating circuits 34, 36, and 38 are not in general in synchronization at their output ports; instead, they have such a timing relationship that the resulting sync signals in the camera outputs on lines 18, 20, and 22 are in synchronization at the input ports of switcher 24. As a result, when the switcher 24 switches from one camera to another, the timing of the synchronization signals that are sent to the central station is unchanged, so there is no temporary loss of sync at a receiving set.

The driver 30 and signal-generating circuits 34, 36, and 38 also provide master color-burst signals for the television cameras 12, 14, and 16 in such a phase relationship that switching between the cameras causes no loss of phase reference, either. In order to achieve these timing relationships, the signal-generating circuits receive the video outputs from the cameras 12, 14, and 16 over lines 46, 48, and 50 and compare them with the driver outputs in a manner that will be described in connection with FIG. 2.

Figure 2:
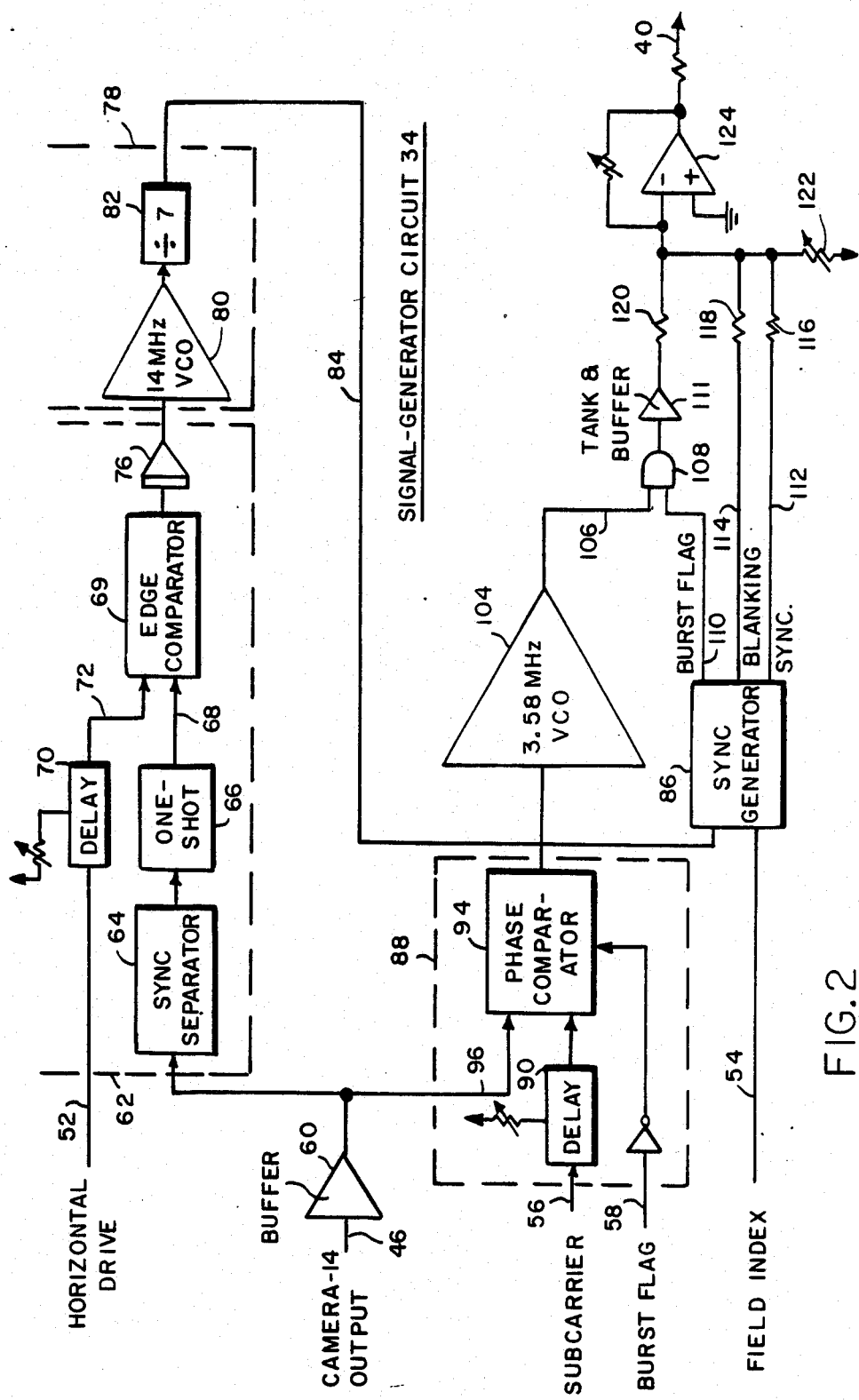
FIG. 2 is a more detailed block diagram of one of the signal-generating circuits illustrated in FIG. 1.

FIG. 2 depicts signal-generating circuit 34 in block-diagram form. The signal-generator output line 40 shown in FIG. 1 is shown at the right-hand side of FIG. 2. The camera 14 input line 46 of FIG. 1 appears at the left side of FIG. 2. Finally, the output line 51 from the driver 30 to signal-generator circuit 34 in FIG. 1 is represented in FIG. 2 by four lines: a horizontal drive line 52, a field-index line 54, a subcarrier line 56, and a burst-flag line 58.

In general, the signal-generator circuit 34 depicted in FIG. 2 sends timing signals to its associated camera 12 and compares the timing of the resultant output received from the camera with master timing signals from the driver 30. A predetermined relationship is desired between the timings of these signals, and, if the observed timing differs from this timing relationship, signal-generator circuit 34 adjusts the timing of the signals that it sends to the camera. In this way, the predetermined timing relationship is maintained.

This predetermined relationship usually is that the master signals at the driver 30 coincide with the camera output signals at the switch 24, and it will be assumed through the remainder of the description that this coincidence obtains. In principle, though, a difference in timing between the master signals and the camera output signals is ordinarily acceptable if the difference is the same for all of the cameras. Coincidence is required only when the reference source 32 is itself a camera or other signal source for the switcher 24.

In FIG. 2, a buffer amplifier 60 receives the camera output on line 46 and feeds it to a comparison circuit 62. Specifically, a sync-separator circuit 64 included in the comparison circuit receives the buffer output, which is composite video, and forwards only the synchronization signals in that composite video signal to a monostable multivibrator, one-shot 66.

One-shot 66 responds to each horizontal sync pulse by generating a longer pulse, one whose duration is a little greater than half that of a horizontal scan. The result is that the one-shot 66 forwards the leading edges of normal horizontal sync pulses but does not pass the equalization and serration signals that occur in composite video between horizontal sync pulses during vertical blanking. The output of one-shot 66 propagates on line 68 to an edge comparator 69, which receives its other output from an adjustable delay circuit 70 along line 72. The input to the delay circuit 70 is a so-called "horizontal drive" signal that is impressed on line 52 by the driver circuit 30. The horizontal drive signal, which is generated by conventional sync-generator circuits, begins slightly before the horizontal sync pulse and ends when that pulse ends.

The delay circuit 70 is adjusted once, typically at the time of manufacture, to compensate for fixed delays internal to the transmission system 10. The function of comparator 69 is to compare the timing of the driver output at the driver 30 with that of the camera output at the switcher 24. However, there is some delay in line 51 between the driver 30 and the signal generator 34. Furthermore, there may be a difference between the time at which the camera output arrives at the switcher 24 and the time at which it arrives at the signal generator 34; the distance from a junction 73 of FIG. 1 to the switcher 24 may not be the same as the distance from that junction to the signal generator 34. Therefore, signals that coincide at the switcher 24 and driver 34 do not necessarily coincide at the input ports of the signal generator 34. Delay circuit 70 introduces enough delay that such coincident signals coincide at the edge comparator 69 even though they arrive at the signal generator 34 at different times. Since the delay differences for which delay circuit 70 compensates are fixed—i.e., since they do not change with changes in the lengths of the leads to camera 12—adjustment of delay circuit 70 only has to be made once.

If the leading edges of the inputs to the edge comparator 69 do not coincide, comparator 69 generates a non-zero output during the interval between them. The polarity of this output is determined by which of the leading edges arrives first. This output is fed to an integrator 76 whose output is an analog signal that changes in accordance with the polarity and duration of the output of comparator 69.

The output of the integrator 76 constitutes the comparison-circuit output, which is sent to a 2.04545 MHz ("2 MHz") voltage-controlled oscillator circuit 78 that includes a 14.31815 MHz ("14 MHz") voltage-controlled oscillator 80 and a divide-by-seven circuit 82.

If the horizontal drive signal at the driver 30 does not coincide with the horizontal sync signal reaching the switcher 24, comparator 69 detects this timing difference, and the output of integrator 76 causes the voltage-controlled oscillator 80 to change its frequency slightly. As will be seen below, this ultimately causes the timing of the camera-output sync signals received by the switcher 24 on line 46 to coincide with the master sync signals at the driver 30.

The output of the voltage-controlled oscillator 78 is fed as timing signals on line 84 to a conventional sync generator 86. In response to these timing signals and to field-index signals from the driver circuit 30 on line 54, the sync generator 86 generates standard video sync signals.

Concurrently, the driver circuit 30 sends a master subcarrier on line 56 to a second comparison circuit 88. The comparison circuit 88 includes an adjustable delay circuit 90, which receives the driver subcarrier output over line 56. The delay circuit 90 performs the same function as delay circuit 70, namely, that of compensating for fixed delays. The delay-circuit output is fed to a phase comparator 94, which also receives, over signal line 96, the camera output from buffer 60. The phase comparator 94 is enabled by a burst-flag signal on line 58 from the driver 30, which indicates when the color-burst signal is present.

Phase comparator 94 compares the phase of the master subcarrier signal on line 56 at the driver 30 with that of the color-burst signal in the composite video from camera 12 at the switcher 24 to determine whether they coincide. The phase comparator 94 operates by sampling, at a time determined by the occurrence of the burst-flag signal, the voltage difference between the camera color burst on line 96 and the delayed master subcarrier from delay circuit 90. It holds this sample at the input port of voltage-controlled oscillator 104 until the next sample is taken, and the frequency of voltage-controlled oscillator 104 increases or decreases slightly if the master subcarrier leads or lags the camera color-burst signal. This causes those signals to coincide.

The output of voltage-controlled oscillator 104 propagates on line 106 to an AND gate 108, whose other input, on line 110, is the burst-flag output of the sync generator 86. The burst-flag output enables AND gate 108 only during those times when the color burst is present. The output of AND gate 108 is thus a square wave having a frequency equal to the color-burst frequency and occurring during those periods when the color-burst flag on line 110 indicates that the color burst is present. The gate-108 output is fed to a tank-and-buffer circuit 111, which converts it from a square wave to a sinusoidal signal.

The other outputs of the sync generator 86 appear on lines 112 and 114. The output on line 112 consists of the vertical and horizontal sync signals, while that on line 114 is the composite blanking signal. These signals are summed with the output of AND gate 108 in a summing circuit that includes resistors 116, 118, and 120, a variable resistor 122, and a variable-gain amplifier 124. The variable resistor 122 is connected to a negative voltage source and is used to set the black level on the amplifier output. The amplifier output on line 40 is the signal that the signal-generator circuit 34 sends to its associated television camera 12.

In operation, the sync generator 86 receives the field-index signal from the driver 30 on line 54. This signal indicates when a field is to begin. The sync generator also receives the timing signals on line 84, which it processes to generate vertical and horizontal sync pulses and composite blanking signals in accordance with the field-index indication. These are added to the keyed output of the color-burst voltage-controlled oscillator 104 to generate signals sent by way of line 40 to the associated camera 12. The camera generates composite video in accordance with these signals and sends it over line 18 (FIG. 1) to the switcher 24 as well as along line 46 to signal-generator circuit 34.

In signal-generator circuit 34, the comparison circuits 62 and 88 compare the timing of the sync and color-burst signals in the camera output with sync and color-burst signals from the driver circuit 30 and advance or retard voltage-controlled oscillators 78 and 104 in accordance with whether the signals at the driver 30 lead or lag those received by the switcher 24. As a result, these signals tend to coincide. Since similar signal-generator circuits 36 and 38 control the other cameras 14 and 16 in a similar manner, the sync signals and color-burst signals from all three cameras are in synchronism with the driver 30 and thus with each other at the input ports of the switcher 24. There is thus no jump in the picture when the switcher 24 switches between cameras.

Figure 3:
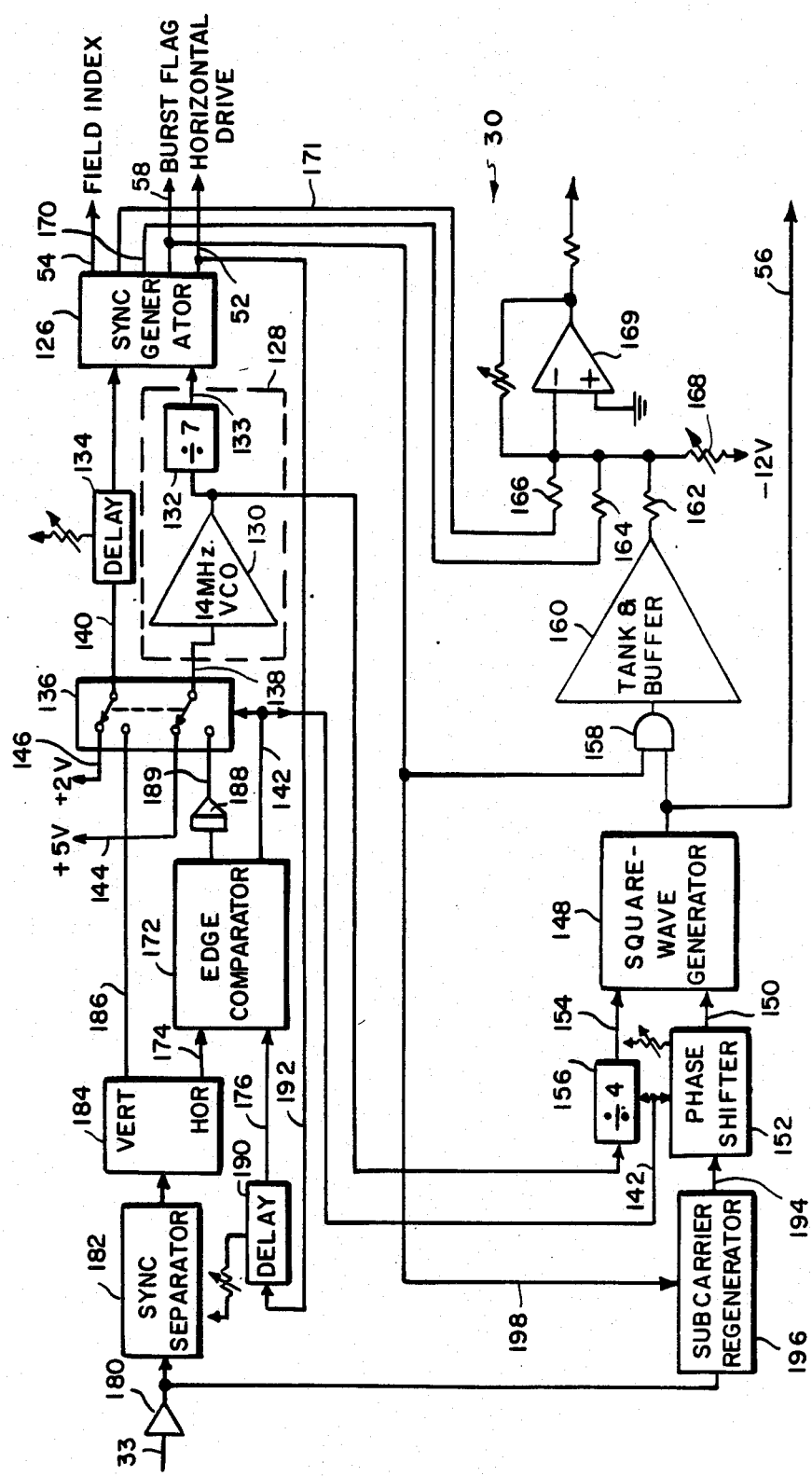
FIG. 3 is a block diagram of a master synchronization source of the type that can be used in the arrangement of FIG. 1.

FIG. 3 depicts the driver 30 that is the source of the master signals that the signal-generating circuit 34 receives on lines 52, 54, 56, and 58 of FIG. 2. A sync-generator circuit 126, similar to sync generator 86 of FIG. 2, generates the signals on the horizontal drive line 52, the field-index line 54, and the burst-flag line 58. Timing for the sync generator 126 of FIG. 3 is provided by a 2-MHz voltage-controlled oscillator 128, which is similar to the 2-MHz voltage-controlled oscillator 78 of FIG. 2 in that it includes a 14-MHz voltage-controlled oscillator 130 and a divide-by-seven circuit 132. The 2-MHz voltage-controlled oscillator 128 feeds its output over line 133 as a timing signal to the sync generator.

The sync generator 126 receives any vertical-reset signals from a delay circuit 134, which in turn receives its output from an electronic double-pole, double-throw switch 136. Switch 136 has two output lines 138 and 140, which feed the voltage-controlled oscillator 130 and the delay circuit 134, respectively. The inputs to the analog switch 136 are selected in accordance with the signal on a control line 142, which indicates whether the circuit of FIG. 3 is to operate in a stand-alone mode or is to be locked onto an incoming reference signal on line 33.

In the stand-alone mode, the analog switch 136 forwards level signals on input lines 144 and 146 to the 2-MHz voltage-controlled oscillator 128 and variable delay circuit 134, respectively. As a result, the 2-MHz voltage-controlled oscillator 128 operates at a fixed frequency determined by the level signal on line 144. Since the analog switch 136 forwards a DC level over line 140 to the variable delay circuit 134, the sync generator 126 receives no reset pulses and so determines its own frame timing while its horizontal-scan timing is determined by the 2-MHz clock 128.

As was described above, the signal-generator circuit of FIG. 2 receives from the driver circuit of FIG. 3 not only the burst-flag, horizontal-drive, and field-index signals but also a color-burst signal. This signal is provided by a square-wave generator 148 of FIG. 3, whose output appears on signal line 56.

Square-wave generator 148 is a monostable multivibrator circuit with two input ports. The signal on one of these input ports triggers the multivibrator on a low-going edge, and the signal on the other input port triggers the multivibrator on a high-going edge. One of these ports receives signals on line 150 from a variable phase shifter 152, which produces no output when the driver 30 is operating in the stand-alone mode. The phase shifter 152 thus does not trigger square-wave generator 148 in that mode. The other port receives signals along signal line 154 from a divide-by-four circuit 156. Circuit 156 receives its input from 14-MHz voltage-controlled oscillator 130, and its output port is enabled or disabled in accordance with the signal on the control line 142, which indicates whether the circuit is in the stand-alone mode. In the stand-alone mode, the divide-by-four circuit 156 is enabled and provides an input to the square-wave generator 148, which in turn provides the chroma subcarrier over line 56 to the signal generator 34 of FIG. 2. In the stand-alone mode, therefore, both the subcarrier signal and the sync-generator timing are ultimately derived from the voltage-controlled oscillator 130.

For present purposes, it is necessary only that the circuit at FIG. 3 generate the signals provided on signal lines 52, 54, 56, and 58. However, it may be convenient in some circumstances to generate an output that includes the sync and color-burst signals specified by the signals from sync generator 126. To do this, an AND gate 158 is provided that receives the subcarrier signal from the square-wave generator 148 as one input and receives the burst-flag signal present on line 58 as its other input. Thus, the subcarrier is gated on and off to provide a color burst, and the resultant signal is fed to a tank-and-buffer circuit 160 that resonates at the subcarrier frequency. This transforms the square-wave output of the AND gate 158 to a sinusoidal signal that is fed to an adder circuit consisting of summing resistors 162, 164, and 166, variable resistor 168, and amplifier 169. The summing circuit adds the sinusoidal signal to the composite sync and blanking signals generated by sync generator 126 on lines 170 and 171 to produce a black-screen output in the same manner that variable-gain amplifier 124 of FIG. 2 does.

As was stated above, the frequency of 2-MHz voltage-controlled oscillator 128 of FIG. 3 is determined by a DC level on line 144 if the driver of FIG. 3 operates in the stand-alone mode. If, on the other hand, the driver is to operate in the locked mode, the control voltage for oscillator 128 is ultimately determined by an edge-comparator circuit 172, which compares the leading-edge timing of signals on two input lines 174 and 176. The signal on input line 174 has its origin in the driver-circuit input line 33. The presence of reference signals on this line places the driver in the locked mode of operation. As FIG. 1 indicates, the reference signals can be generated by a timing standard 32. Alternatively, the signal on line 33 can be a composite-video signal from, for instance, a fourth television camera with which the other cameras 12, 14, and 16 are intended to be in synchronism.

A buffer amplifier 180 receives this signal and applies it to a sync-separator circuit 182, which forwards only the sync-signal portion of the video input. A further separator circuit 184 separates the horizontal-sync pulses from the vertical-sync pulses. It sends the vertical-sync pulses to one of the input lines of the electronic double-pole, double-throw switch 136 by way of signal line 186, and it sends the horizontal pulses to edge-comparator input line 174. If the edge-comparator circuit 172 receives horizontal-sync pulses on line 174, then it provides an output on line 142 that indicates that the circuit is to be operated in the lock mode rather than the stand-alone mode, and it switches analog switch 136 to the state in which it forwards the inputs from lines 186 and 189.

The edge-comparator circuit 172 compares the leading edges of pulses on its input lines 174 and 176 and provides an output similar to that of edge comparator 69 to a similar integrator 188, whose output is provided on a signal line 189 to another of the input ports of switch 136.

The edge-comparator input on line 176 is provided by an adjustable delay circuit 190, which receives the horizontal drive signal on line 192 from sync-generator circuit 126. As was mentioned above, the horizontal driver signal is a conventional signal generated by standard sync-generator circuits; it is a pulse that begins shortly before the horizontal sync pulse is to start, and it ends when that pulse ends. Thus, edge comparator 172 compares the time of occurrence of the reference horizontal pulse with that of the master horizontal drive output of the driver 30.

The output of integrator 188 is similar to that of integrator 76 of FIG. 2; it changes in accordance with the polarity and duration of the output of comparator 172. Accordingly, the output of integrator 188 is an indication of the delay between the signals on lines 174 and 176.

In the lock mode, switch 136 provides this output on line 138 to the voltage-controlled oscillator 130. This signal controls the frequency of voltage-controlled oscillator 130 to cause the timing of the horizontal drive signal on line 152—as well as of the other signals provided by sync generator 126—to be advanced or retarded in accordance with whether the leading edge of the pulse on line 174 occurs before or after the pulse on line 176. The increase or decrease in frequency will cause the pulse on line 176 to occur earlier or later so as to narrow the time gap between the two pulses and cause the horizontal-driver output of sync generator 126 to tend to maintain the timing relationship with the signal on the input line 33 set by delay circuit 190.

Additionally, the switch 136 passes the vertical-sync pulses from separator circuit 184 to sync generator 126 via delay unit 134. These pulses reset the sync generator 126, so the timing of vertical as well as of horizontal scans is determined by the input signal on line 33.

The purpose of the delay circuit 134 is to accommodate the reset protocol of the sync generator 126. Specifically, when the sync generator 126 receives a reset signal, it sets itself to a point $2\frac{1}{2}$ lines into the first vertical scan of a two-scan frame. Since the vertical sync pulse received on line 140 occurs at the beginning of the vertical scan, it is necessary to delay the pulse by about $2\frac{1}{2}$ lines so that the vertical position resulting from the sync-generator outputs of sync generator 126 will agree with the vertical position indicated by the composite video signal on line 33.

The timing relationship determined by the adjustable delay circuit 190 is adjusted manually to achieve the desired relationship between the input signal on line 33 and the output signals on lines 52, 54, 56, and 58. Ordinarily, if the input on line 33 is from a timing standard at the remote location, there is no need for adjustment of the delay circuit 190, because it is necessary only that the outputs of sync generator 126 occur at the same rate as the sync signals in the signal on line 33, not that they occur simultaneously. However, it may be desired to use the output of a fourth television camera as the timing for the three cameras shown in FIG. 1. If so, the other three cameras must be clocked not only at the same rate as the fourth camera but also in synchronism with it, and delay circuit 190 is adjusted manually to achieve this synchronism. Once this adjustment is made, however, there is no need for further adjustment so long as the signal lines connected to the reference camera are not changed, even if the signal lines to the other cameras are.

In the locked mode, the subcarrier signal on line 56 does not originate in the 14-MHz voltage-controlled oscillator, because the signal on control line 142 operates to disable the output of divide-by-four circuit 156 and enable the adjustable phase-shift circuit 152. Circuit 152 receives a subcarrier signal on line 194 from a subcarrier regenerator 196. The subcarrier regenerator 196 includes a subcarrier oscillator in a phase-locked-loop circuit. It receives the input signal from buffer amplifier 180 and locks its subcarrier oscillator to that part of the input signal that is present when it receives the burst-flag signal from sync generator 126 by way of line 198—that is, it locks its subcarrier oscillator to the color-burst portion of the input signal. The subcarrier generator 196 thus transmits continuous subcarrier along line 194 to the phase shifter 152.

After subjecting this signal to a phase shift that is adjustable for reasons the same as those for which adjustable delay circuit 190 is, the phase shifter 152 applies the subcarrier signal to one of the input ports of the square-wave generator 148. Since the divide-by-four circuit 156 is disabled, the output of the phase shifter 152 on line 150 is the only input to the square-shifter wave generator 148. In the lock mode, therefore, the subcarrier signal on line 56 from the square-wave generator 148 is derived ultimately from the reference signal received at line 33 rather than, as it is in the stand-alone mode, from voltage-controlled oscillator 130.

In summary, then, the driver circuit of FIG. 3 has a voltage-controlled oscillator 130 that runs freely and provides the timing for both color-burst generation and sync-pulse generation when no signal is received on input line 33. When a composite-video-type signal appears on line 33, its horizontal sync pulses are detected by edge comparator 172, which in response shifts the circuit from the stand-alone, mode to the lock mode. In the lock mode, the color-burst signals on line 56 are derived from the input circuit, and the sync-generator timing signals on line 133 are generated by the voltage-controlled oscillator 130, which is locked to and reset by the horizontal-sync and vertical-sync pulses received on line 33.

It is apparent from the foregoing description that the camera-synchronizing circuitry of the present invention greatly simplifies operation in a remote multi-camera location. Manual adjustment of the relative timing between several cameras connected to the signal-generating circuit is eliminated, not only at the beginning of operation but also at times when the signal lines to individual cameras are changed. Furthermore, the driver circuit is so arranged that it can readily provide timing, both standing alone and by reference to a standard. Furthermore, it automatically changes to the stand-alone mode without a sudden change in sync or subcarrier timing if, for some reason, the standard signal should be suddenly lost. The present invention thus constitutes a significant advance in the art.

I claim:

1. An apparatus for generating standard video sync and color-burst signals and sending the standard video sync and color-burst signals to a plurality of color video cameras that receive the standard video sync and color-burst signals and incorporate them in composite-video camera outputs that the cameras send over separate signal paths to a common reception device, the apparatus comprising:

A. a central timing circuit, adapted to receive horizontal reference signals and reference subcarrier signals, for generating master sync signals and master color-burst signals, the master sync including master horizontal sync signals, the central timing circuit including:

i. a master sync generator, adapted to receive periodically occurring master timing signals, for generating master standard video sync signals in a first predetermiend master timing relationship with the received msater timing signals and providing, as the master sync signals, the master standard video sync signals generated by the master sync generator;

ii. a master voltage-controlled oscillator means for generating said periodically occurring master timing signals and connected for application of the master timing signals to the master sync generator, the master voltage-controlled oscillator means being adapted for application thereto of master control signals and varying the timing of the master timing signals in response to the master control signals, the master voltage-controlled oscillator means including:

(a) a common voltage-controlled oscillator for generating periodically occurring common timing signals, connected for application thereto of the master control signals, and varying the timing of the common timing signals in response to the master control signals; and (b) a master divider circuit, connected for application of the common timing signals thereto, for generating as the master timing signals a signal whose frequency is a first fraction of the frequency of the common timing signals;

iii. a master comparison circuit, connected to receive the horizontal reference signals and monitor the timing of the master horizontal sync signals, for comparing the timing of the horizontal reference signals with that of the master horizontal sync signals, generating said master control signals, and applying those master control signals to the master voltage-controlled oscillator to advance the timing of the master timing signals if the master horizontal sync signals lag a second predetermiend master timing relationship between the master horizontal sync signals and the horizontal reference signals and to retard the timing of the master timing signals if the master horizontal sync signals lead the second predetermined master timing relationship, the central timing circuit thereby tending to keep the master horizontal sync signals in the second predetermined master timing relationship with the horiozntal reference signals; and iv. means for generating master color-burst signals in a predetermined master phase relationship with the reference subcarrier signals including a color-burst divider circuit connected to receive the common timing signals and generate as color-burst timing signals a signal whose frequency is a second fraction of the frequency of the common timing signals, the means for generating master color-burst signals generating the master color-burst signals fro the color-burst timing signals in absence of reception of the reference subcarrier signals; and B. a plurality of signal-generating circuits, each of the plurality of video cameras being associated with a different one of the signal-generating circuits, each signal-generating circuit comprising:

i. a first camera sync generator, adapted to receive periodically occurring camera timing signals, for generating individual standard video sync signals, including standard horizontal sync signals, in a predetermined sync-generator timing relationship with the received camera timing signals and sending said individual standard video sync signals to the associated video camera;

ii. a first camera voltage-controlled oscillator for generating the periodically occurring camera timing signals and connected to provide the camera timing signals to the camera sync generator, the first camera voltage-controlled oscillator being adapted for application thereto of camera control signals and varying the timing of the camera timing signals in response to the camera control signals;

iii. a first camera comparison circuit connected to compare the timing of the master horizontal sync signals at the central timing circuit with the timing, at the common reception device, of horizontal sync signals sent by the associated camera, which signals are denominated associated-camera horizontal sync signals, and to generate camera control signals and apply the camera control signals to the camera voltage-controlled oscillator to advance the timing of the camera timing signals if the associated-camera horizontal sync csignals lag a predetermined camera timing relationship with the master horizontal sync signals and to retard the timing of the camera timing signals if the associated camera horizontal sync signals lead the predetermined camera timing relationship with the master horizontal sync signals, the associated camera horizontal sync signal from the plurality of video cameras thereby tending to be in synchronism with each other at the common reception device;

iv. a second camera voltage-controlled oscillator for generating individual standard color-burst signals and sending them to the associated video camera, the second voltage-controlled oscillator being adapted for application thereto of phase-control signals and varying the phase of the individual standard color-brust signals in response to the phase-control signals; and v. a second camera comparison circuit, connected to receive the master color-burst signals and adapted for reception of the video output of the associated video camera, including color-burst signals therein, which color-burst signals are denominated associated camera color-burst signals, for comparing the phase that the master color-burst signals have at the central timing circuit with the phase that the associated camera color-burst signals have at the common reception device, generating said phase-control signals, and applying the phase-control signals to the second camera voltage-controlled oscillators to advance the phase of the individual standard color-burst signals if the associated camera color-burst signals lag a predetermined camera phase relationship with the master color-burst signals and to retard the phase of the individual stadnard color-burst signals if the camera color-burst signals lead the predetermined camera phase relationship with the master color-burst signals, the associated camera color-burst signals from the plurality of video cameras thereby tending to be in synchronism with each other at the common reception device.

* * * * *